No. 802,576. PATENTED OCT. 24, 1905.
K. LÖHLE & E. OELHAFEN.
SHIP LIFTING APPARATUS.
APPLICATION FILED APR. 1, 1905.

2 SHEETS—SHEET 1.

Witnesses:
Harry L. Amer.
P. Dommers

Inventors.
Karl Löhle and
Ernst Oelhafen.
by Henry Orth Jr. atty.

No. 802,576. PATENTED OCT. 24, 1905.
K. LÖHLE & E. OELHAFEN.
SHIP LIFTING APPARATUS.
APPLICATION FILED APR. 1, 1905.
2 SHEETS—SHEET 2.
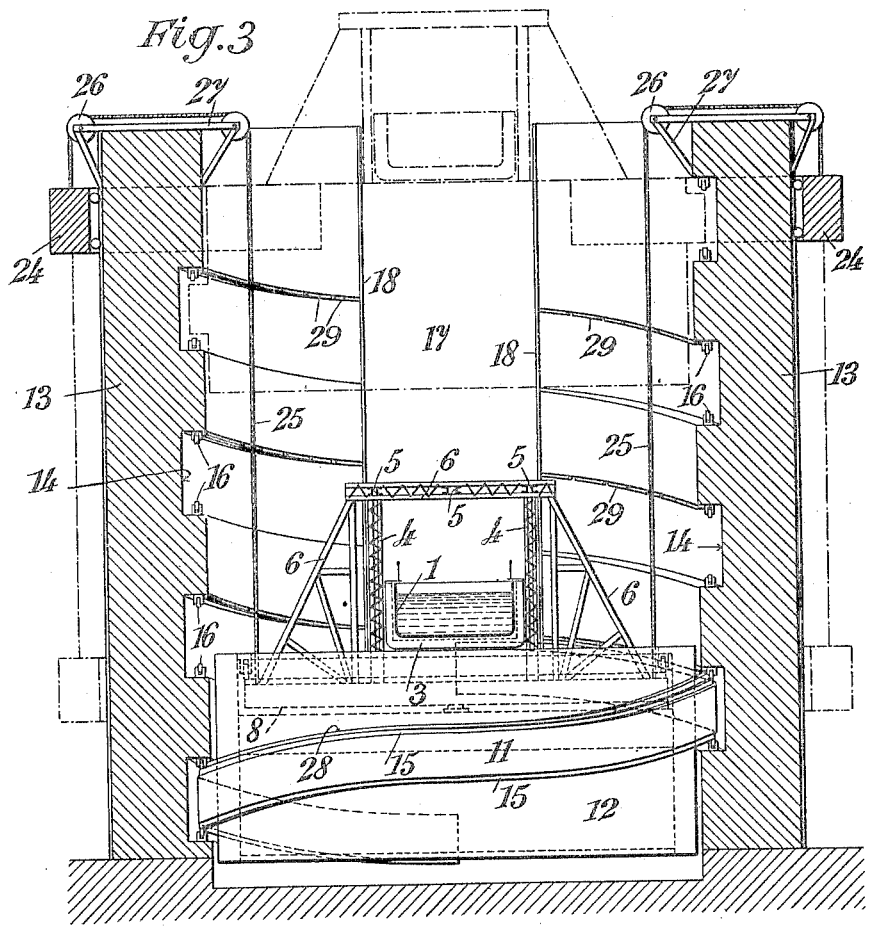
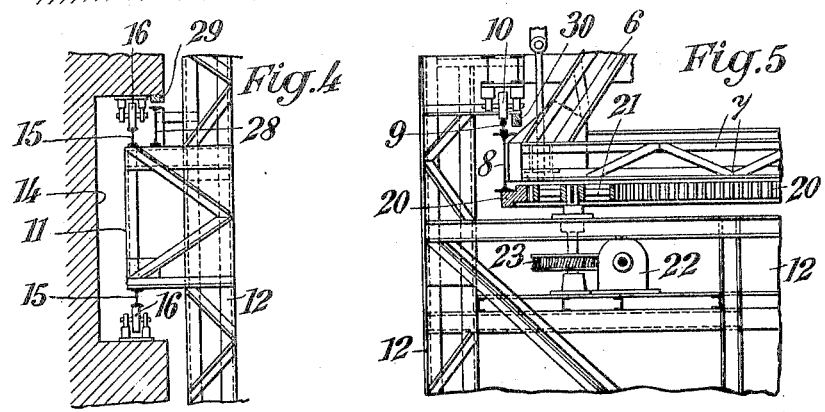
Witnesses:
Harry L. Amer.
B. Bommers
Inventors.
Karl Löhle and
Ernst Oelhafen.
by Henry Orth Jr. Atty.

UNITED STATES PATENT OFFICE.

KARL LÖHLE AND ERNST OELHAFEN, OF ZURICH, SWITZERLAND.

SHIP-LIFTING APPARATUS.

No. 802,576.        Specification of Letters Patent.        Patented Oct. 24, 1905.

Application filed April 1, 1905. Serial No. 253,305.

*To all whom it may concern:*

Be it known that we, KARL LÖHLE and ERNST OELHAFEN, citizens of the Republic of Switzerland, residing at Zurich, Switzerland, have invented new and useful Improvements in Ship-Lifting Apparatus, of which the following is a specification.

This invention has reference to a vertical ship-lifting apparatus in which a trough adapted to receive ships rests upon one or more supporting-frames, which carry a rotating carriage that acts as a screw-spindle and is movable upward and downward in a fixed superstructure in the form of a screw-nut, said superstructure or screw-nut being provided with two vertical slots located diametrically opposite each other, which form guides for the trough and prevent rotation thereof.

The accompanying illustrative drawings show by way of example one construction of ship-lifting apparatus according to this invention.

Figure 1:
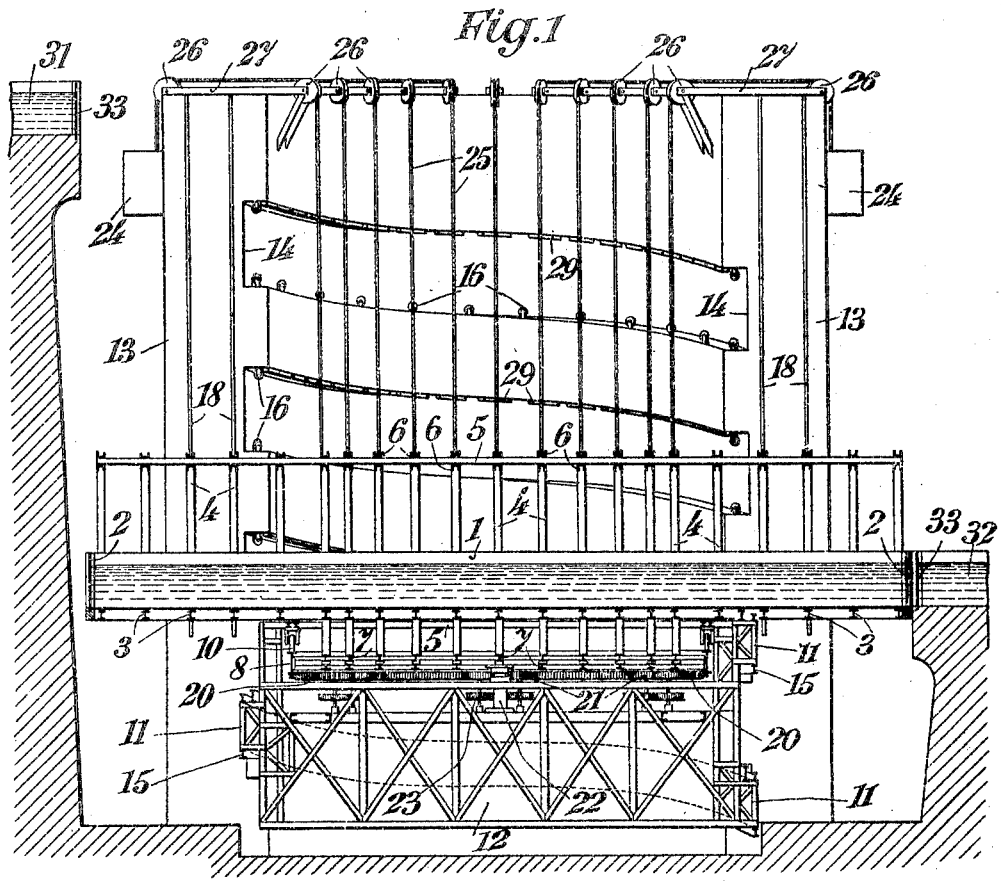
Figure 2:
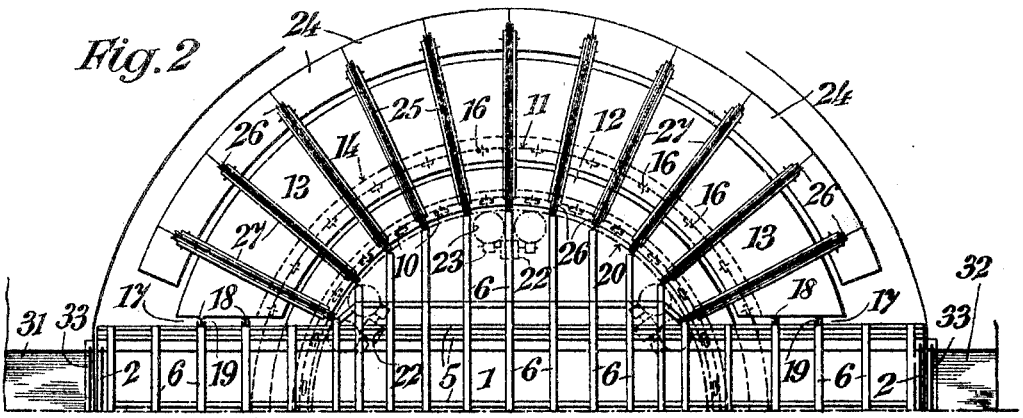

Figure 1 of said drawings shows the apparatus in vertical longitudinal section. Fig. 2 shows one-half of the apparatus in plan. Fig. 3 is a view showing the apparatus partly in transverse section and partly in elevation, and Figs. 4 and 5 are detail views showing parts of the apparatus to a larger scale.

Both ends of the trough 1, which is filled with water and into which the ship to be lifted or lowered is brought, are provided with sluice-gates 2, whereby the trough ends can be closed, so as to keep the water in the trough in a well-known manner. The trough 1 rests upon a supporting-frame consisting of cross-bearers 3, suspended from vertical posts 4, and framework longitudinal carriers with ties 5, which rest, with ties 6 and 7, in framework cross-bearers, Figs. 1, 2, and 3. The ties 7 are connected with one another at their ends by a circularly-bent bearer 8, that carries a running-rail 9, Fig. 5, upon which work rollers 10.

12 indicates a rotating carriage which forms the screw-spindle and which is provided on its outer periphery with a screw-thread 11 and is preferably constructed of iron framework, the upper portion of which extends over the rail 8. The rollers 10 are mounted on the under side of this overextending portion, so that the rotative carriage or screw-spindle 12 is thereby coupled to and carried by the supporting-frame 3 to 9, Figs. 1, 3, and 5.

The screw-spindle carriage 12 is arranged to move up and down in a fixed cylindrical superstructure 13, constituting a screw-nut and consisting of masonry in the example illustrated, although it may, if desired, be constructed of separate iron framework-standards, connected together by appropriate members and stays.

The screw-thread 11 of the rotating screw-spindle carriage 12 engages in the internal screw-thread 14 of the fixed nut 13 and has upon its upper and under side running-rails 15, upon which work rollers 16, mounted on the upper and lower faces of the thread 14 of the screw-nut.

The internal diameter of the screw-nut 13 is less than the length of the trough 1 to be raised, so that the nut does not entirely embrace the trough.

For the purpose of enabling the trough to be brought into position partly within the nut two oppositely-located vertical openings or slots 17 are formed through the wall of the nut, the breadth of said openings or slots being such as to afford sufficient room for the end portions of the trough 1, together with the adjacent parts of its supporting-frame, to freely slide up and down therein, Figs. 2 and 3.

The vertical openings or slots 17 are each provided with vertically-arranged guide-rails 18, which engage counter guide-rails 19 on the supporting-frame of the trough 1, and thereby guide the supporting-frame vertically, Fig. 2.

On the under side of the bearer 8 is attached a ring 20, provided with internal teeth, in which engage spur-wheels 21, that are driven by electromotors 22 through worm-gears 23, Figs. 1, 2, and 5. The electromotors 22 are mounted upon the rotating carriage 12 and move with it.

To obviate the necessity of the motors 22 having to lift the full weight of the rotating carriage 12, together with the supporting-frame, trough 1, and the contents of the trough, couterweights 24 are provided, so that the motors 22 may only have to overcome the frictional resistances. These counterweights are attached by chains 25 to the points where the ties 6 bear upon the members 7 of the supporting-frame, and they bear on the outside of the screw-nut 13 through rollers on their inner face. The supporting-chains 25 are passed over rollers 26, arranged in carriers 27 at the top of the screw-nut, Figs. 1 to 3.

In order that the rollers 16 may not be strained should the upward pressure exerted by the rotating carriage 12 become from any cause too great, the rollers 16 are mounted on springs which are compressed when undue pressure takes place, so that a brake-rail 28, that is fixed upon the upper side of the screw-thread 11 near to the rail 15 is caused to bear upon brake-blocks 29, arranged upon the upper side of the thread of the nut 13, Fig. 4.

The rollers 10 of the rotating carriage 12 are in a similar manner also mounted upon springs, so that in the event of undue upward pressure they will not be strained.

30 indicates the brake-blocks fixed to the carriage 12 near to the rollers 10 and which is adapted to come in contact with the upper end of the rail 8 and to thereby receive the upward pressure when the springs of the rollers 10 are compressed, Fig. 5.

31 is the upper, and 32 the lower, canal-reach, both of which are furnished with shut-off sluice-gates 33.

The operation of the ship-lifting apparatus described is as follows: Presuming that a ship in the lower canal-reach 32 is to be lifted into the upper reach 31, the trough 1 is brought into the position shown in Fig. 1 in line with and joined onto the canal-reach 32. The corresponding sluice-gates 2 and 33 are then opened and the ship brought from the reach 33 into the trough 1, whereupon the sluice-gates 2 and 33 are again closed. The electromotors 22 are now set in motion, so as to rotate the spur-wheels 21, which engage in the toothed ring 20 of the supporting-frame 3 to 9. As, however, the trough 1 is guided in the fixed slots 17, it, together with the supporting-frame 3 to 9, is prevented from rotating, and the carriage 12 is thus caused to rotate on the non-rotating roller-track 9. This rotation of the carriage 12 causes the screw-thread 11 on its exterior to rotate in the thread 14 of the fixed screw-nut 13, and thus the carriage 12 and trough 1, with its contents, are lifted. When the trough 1 has reached the level of the upper canal-reach 31, the motors 22 are stopped and the trough joined onto the reach 31. The corresponding sluice-gates 2 and 33 are then opened and the ship brought out of the trough. While the trough 1 is in its upper position a ship to be brought to the lower canal-reach 32 can be brought into it from the upper reach 31, and by rotating the carriage 12 through the motors 22 in the opposite direction the trough, with ship, can be brought down and the ship moved into the canal-reach 32, the corresponding sluice-gates of the trough and the corresponding sluice-gates of the canal-reaches being opened and shut from time to time after moving the ship to be raised or lowered in or out of the trough, as the case may be.

The carrier 8 might be equally well arranged upon the rotating carriage 12 instead of on the supporting-frame of the trough, the rollers 10, with the brake-blocks 30, being then arranged upon the trough-supporting frame.

It would be also practicable to mount the running rollers 16 of the screw-thread on the rotating carriage 12 instead of on the nut 13, the rails 15 being then in the screw-threads of the screw-nut. The brake-rail 28 might be attached to the thread of the screw-nut instead of to the rotary carriage.

When the ship's trough to be lifted is extraordinarily long, a number of the screw-nuts 13, with screw-spindles 12, as described, may be arranged in line, the long trough extending across them all, so that it would be possible to raise and lower ships of every dimension and loading capacity.

Having now particularly described and ascertained the nature of the said invention and in what manner the same is to be performed, we declare that what we claim is—

1. In a ship-lifting apparatus, the combination with a trough to receive the ships, of a rotatable screw supporting the trough and a superstructure having spiral ways and forming a nut in which said screw is rotatable, substantially as described.

2. The combination in a vertical ship-lifting apparatus, of a trough adapted to receive the ships, a supporting-frame upon which the trough rests, a rotatable carriage carrying the frame and acting as a screw-spindle, a fixed superstructure in the form of a screw-nut, in which the carriage is movable upward and downward and which has two vertical slots located diametrically opposite each other said slots forming guides for the trough, substantially as described.

3. The combination in a vertical ship-lifting apparatus of a trough adapted to receive the ships, a supporting-frame upon which the trough rests, a rotatable carriage carrying the frame and acting as a screw-spindle, a fixed superstructure in the form of a screw-nut in which the carriage is movable upward and downward and which has two vertical slots located diametrically opposite each other, said slots forming guides for the trough, and rollers and rails between the mutually-engaging screw-threads of the rotating carriage and superstructure, said rollers being fixed to one said part, and working against the rails that are fixed to the other part, substantially as described.

4. In a ship-lifting apparatus, the combination with a non-rotatable trough to receive the ships, of a rotatable screw supporting the trough and a superstructure having spiral ways and forming a nut in which said screw is rotatable, substantially as described.

5. The combination in a vertical ship-lifting apparatus of a trough adapted to receive the ships, a supporting-frame upon which the trough rests, a rotatable carriage carrying the frame and acting as a screw-spindle, a fixed superstructure in the form of a screw-nut in which the carriage is movable upward and downward and which has two vertical slots located diametrically opposite each other said slots forming guides for the trough, rollers working against rails being provided between the mutually-engaging screw-threads of the rotating carriage and the fixed superstructure, and also between the rotating carriage and supporting-frame, substantially as described.

6. The combination in a vertical ship-lifting apparatus of a trough adapted to receive the ships, a supporting-frame, upon which the trough rests, a rotatable carriage carrying the frame and acting as a screw-spindle, a fixed superstructure in the form of a screw-nut in which the carriage is movable upward and downward and which has two vertical slots located diametrically opposite each other said slots forming guides for the trough, rollers working against rails and mounted on springs being arranged between the mutually-engaging screw-threads of the rotating carriage and the fixed superstructure, and also between the rotating carriage and the trough-supporting frame and brake devices arranged adjacent to the rollers, said brake devices being adapted to come into operation only when the pressure exerted is so much above the usual as to compress the springs of said rollers, substantially as described.

7. The combination in a vertical ship-lifting apparatus, of a trough adapted to receive the ships, a supporting-frame upon which the trough rests, a rotatable carriage carrying the frame and acting as a screw-spindle, a fixed superstructure in the form of a screw-nut in which the carriage is movable upward and downward and which has two vertical slots located diametrically opposite each other, said slots forming guides for the trough, rollers working against rails and mounted upon springs being arranged between the rotating carriage and fixed superstructure, and also between the rotating carriage and the trough-supporting frame, and adjacent to the rollers, brake devices consisting of brake-rails and brake-blocks, said brake devices being adapted to come into operation, only when the pressure exerted is so much above the usual as to compress the springs of said rollers, substantially as described.

8. The combination in a vertical ship-lifting apparatus of a trough adapted to receive the ships, a supporting-frame upon which the trough rests, a rotatable carriage carrying said frame and acting as a screw-spindle, a fixed superstructure in the form of a screw-nut in which the carriage is movable upward and downward and which has two vertical slots located diametrically opposite each other, said slots forming guides for the trough, the trough, the supporting-frame and the rotatable carriage being counterbalanced by counterweights, substantially as described.

9. In a ship-lifting apparatus, the combination with a trough and its supporting-frame, of a rotatable screw mounted on the frame, a fixed superstructure having spiral ways in which said screw operates, and mechanism mounted on the screw and coöperating with the frame to rotate the screw, substantially as described.

10. In a ship-lifting apparatus, the combination with a trough and its supporting-frame, of a movable built-up structure rotatably connected to said frame and having the general form of a screw member, a fixed superstructure having the general form of a complementary screw member engaged by the built-up structure, substantially as described.

11. In a ship-lifting apparatus, the combination with a trough to receive the ships and a supporting-frame therefor, of a rotatable built-up structure having a helix thereon, a ring on the frame, and mechanism on the structure to engage the ring and rotate the structure and helix, said trough longer than the diameter of the helix, a fixed superstructure having a spiral way therein in which the helix engages and means to counterbalance the weight of the vertically-moving parts, substantially as describbed.

In testimony whereof we have signed our names to this specification in the presence of two subscribing witnesses.

KARL LÖHLE.
ERNST OELHAFEN.

Witnesses:
  A. LIEBERKNECHT,
  E. BLUM.